United States Patent [19]

Gardner et al.

[11] Patent Number: 4,738,432

[45] Date of Patent: Apr. 19, 1988

[54] FLUID FLOW CONTROL VALVES

[75] Inventors: Frederick B. Gardner; Malcolm C. Hanson; Kenneth J. Richardson, all of Redditch, England

[73] Assignee: Simon-Hartley Limited, Staffordshire, England

[21] Appl. No.: 47,471

[22] Filed: May 11, 1987

[30] Foreign Application Priority Data

May 14, 1986 [GB] United Kingdom ................. 8611777

[51] Int. Cl.⁴ .............................................. F16K 3/02
[52] U.S. Cl. .................................... 251/328; 251/327; 251/368
[58] Field of Search ................. 251/328, 327, 317, 368

[56] References Cited

U.S. PATENT DOCUMENTS 3,897,043 7/1975 McBain et al. ..................... 251/328

Primary Examiner—Arnold Rosenthal
Attorney, Agent, or Firm—Nies, Webner, Kurz & Bergert

[57] ABSTRACT

A valve such as penstock with a gate (13) which slides across an opening in a frame (10, 11, 12). On at least one side of the gate (13) is a two-part sealing strip consisting of resilient layer (22) and a superimposed bearing portion (23). Attached to or integral with bearing portion (23) is a thickened part (24) which limits the maximum compression of the resilient layer (22) when the valve is closed.

10 Claims, 1 Drawing Sheet

FLUID FLOW CONTROL VALVES

This invention concerns fluid flow control valves and more particularly sealing means therefor, and is especially concerned with penstock valves of the type comprising a sliding closure member slidable across an opening to control the flow of fluid therethrough.

Valves of this type usually include a sealing means arranged in strip form between the closure member (when closed) and a frame surrounding the opening, in which the closure member is arranged to slide. The sealing strip may comprise a layer of resilient material fixed with respect to one of the co-operating surface portions of the closure member and the frame respectively, and a bearing portion bonded to the resilient layer and thus adapted to bear on the other side surface portion and having a lower coefficient of friction, with respect to the other surface portion than the resilient layer whereby the bearing portion is arranged to slide on the other surface portion as the closure member is moved between its closed and open postions in operation of the valve.

A problem sometimes experienced with this type of sealing means accrues from the fact that, if the closure member remains in its closed condition for long periods during which the pressure of fluid on the upstream side of the valve causes the resilient layer of the seal to remain in a compressed state, there is a tendency for the resilient layer to become permanently deformed. Therefore, when the closure member is opened the resilient layer does not return to its original relaxed state. This can result in the seal becoming ineffective, which in turn results in leakage between the closure member and the frame when the valve is closed, and particularly when fluid pressure is exerted on the closure member in a direction opposite to that normally experienced by the valve.

An object of the present invention is therefore to provide a valve of the type referred to having sealing means wherein the afore-mentioned problem is overcome or at least alleviated.

Thus, according to the present invention there is provided a valve comprising a sliding closure member slidable across an opening defined within a frame to control the flow of liquid through said opening, and a sealing strip arranged between co-operating surface portions of the frame and the closure member respectively, the sealing strip comprising a layer of resilient material fixed with respect to one of the surface portions, and a bearing portion bonded to the resilient layer and adapted to bear on the other surface portion thus to slide thereon as the closure member is moved between its closed and open positions in operation of the valve, characterised in that the bearing portion carries a part of increased thickness which extends towards the surface portion to which the resilient layer is fixed, said part thus serving to limit the maximum compression of the resilient portion when the valve is closed.

Embodiments of the invention will now be described by way of example only, with reference to the accompanying drawings, in which:

FIG. 1 is a schematic elevation of a valve of the type referred to;

Figure 1:
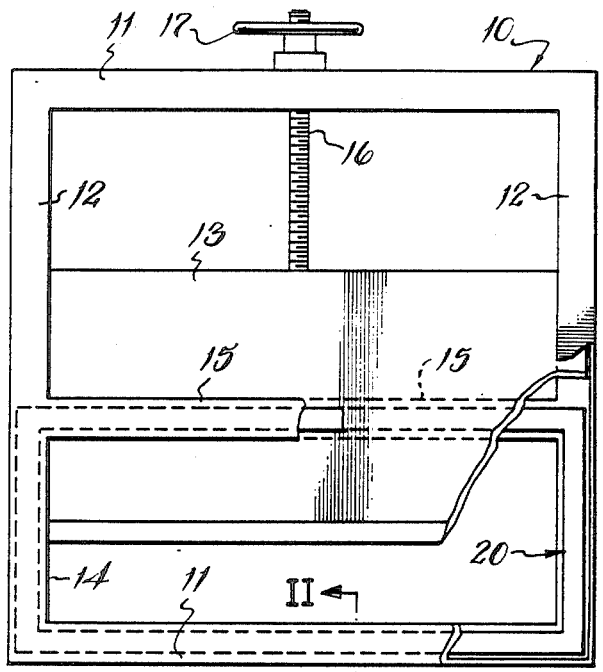

The valve comprises a frame generally indicated at 10 having horizontal and vertical frame members 11 and 12 respectively. The frame is of channel construction such that a closure member 13 may slide vertically within same and is thus adapted selectively to pass across an opening 14 defined by the base and lower side regions of the frame, and a pair of cross members 15 arranged one on each side of the closure member and connected at their ends respectively with the side members 12 of the frame.

The closure member 13 is adapted to be raised and lowered by means of a conventional threaded rod 16 and handwheel 17. The handwheel may of course be replaced by an automotive device if required.

A sealing strip generally indicated at 20 is attached to the frame members around the opening 14 on one side of the closure member 13. On the other side a further sealing strip 21 (see FIG. 2) is provided. The construction and purpose of these sealing strips will now be described in detail.

The sealing strip 20 which extends around the peripheral region of the opening 14, includes a layer 22 of resilient material such as closed cell, non-absorbent foamed material selected according to the conditions which it must withstand in use, for example nitrile or neoprene rubber, and the layer 22 is bonded to its associated part of the frame. The sealing strip 20 also includes a bearing portion 23 bonded to the face of the layer 22 remote from the adjacent frame member, and comprising a flexible but non-resilient material having lower frictional properties than the layer 22. This material is preferably non-absorbent and wear resistant, for example, to abrasion by grit or the like, and may be medium or high density, high molecular weight polyethylene.

The bearing portion 23 carries a part 24 of increased thickness. This is preferably as shown in the form of a longitudinal rib integrally moulded with the bearing portion 24 and having a thickness less than and approximately half of that of resilient layer 22. To accommodate part 24, the layer 22 may be formed with a corresponding longitudinal groove, or alternatively the layer 22 may be comprised of separate pieces one on each side of the part 24 with an additional piece bonded to the surfaces of the separate pieces to bridge across the top of part 24.

The sealing strip 21 which may be adjustable relative to the frame towards the closure member 13, also extending in strip form around the peripheral region of the opening 14 and disposed on the opposite side thereof to the strip 20 and facing same, comprises in cross-section a rigid portion 25 of metal or other non-resilient material welded or bonded to the adjacent surface portion of the frame, and a bearing portion 26 bonded to the outer face of the portion 25 and of similar material to the portion 23 of sealing strip 20.

The co-operating leading edges of the bearing portions 23 and 26, and the closure member 13 are chamfered for ease of introduction of the latter between the sealing strips 20 and 21 when the valve is moving towards a closed condition.

In use, as the closure member 13 passes across the opening 14 it is caused to slide upon the bearing portions 23 and 26 of the sealing strips 20 and 21 respectively. In order for the closure member to pass between said bearing portions 23 and 26 it is necessary for the resilient layer 22 of strip 20 to become at least partially compressed. Preferably, the degree by which the layer 22 is compressed is less than that required for the part 24 of bearing portion 23 to compress completely that part of layer 22 beneath it.

Figure 2:
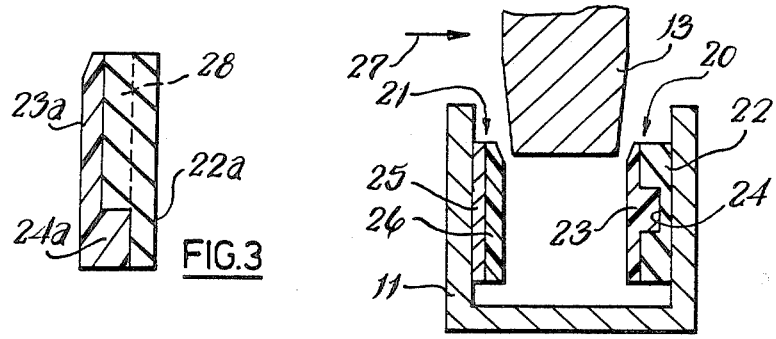
FIG. 2 is a section taken on line II—II of FIG. 1, but with the closure member in an almost closed condition.

The valve is arranged in use such that when the closure member 13 is raised above the opening 14 fluid can flow through the latter in the direction of the arrow 27 (FIG. 2). Therefore, when the closure member is lowered completely to occlude the opening 14 the resistance created by the resilient layer 22 preventing the closure member 13 from being displaced in the direction of the arrow 27 presents a firm seal, and the part 24 prevents the resilient layer 22 from becoming permanently deformed and thus ineffective. Thus, when the valve is closed a complete seal is ensured, even in the event of fluid pressure being applied in the reverse direction.

Figure 3:
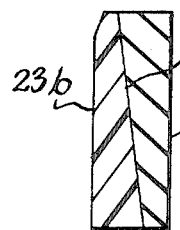
FIG. 3 and 4 are cross sectional views of a sealing strip according to two further embodiments.
Figure 4:
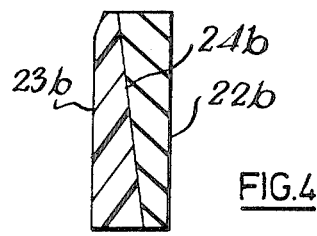

Referring now to FIGS. 3 and 4, it can be seen that the bearing portion 23 and its integral part 24 can be arranged differently for example as illustrated at 23a and 24a, with the resilient layer 22a correspondingly formed. Again, layer 22a may be made from two separate parts bonded together as indicated by the dotted line 28.

Alternatively, as illustrated in FIG. 4, the bearing portion 23b may be wedge-shaped as illustrated at 24b to form the portion of increased thickness at the thicker end of the wedge, with the resilient layer 22b correspondingly shaped. The mating wedge surfaces of the bearing portion and resilient layer may be stepped instead of representing a continuous slope.

It is not intended to limit the invention to the above examples alone, many variations such as might readily occur to one skilled in the art being possible without departing from the scope of the invention.

For example, the sealing strips 21 may in some applications be identical in construction with the sealing strip 20, particularly where it is necessary to provide an effective seal against flow in either direction through the valve.

In a further example, the thickened part 24 and those equivalent parts in FIGS. 3 and 4 may, instead, be formed by a separate strip of a material more rigid than that of the resilient layer 22 which may be bonded to the bearing portion 23. Also, in the embodiment of FIG. 2, it is not essential in all cases for the resilient layer to extend across the face of part 24, though this is thought to be preferable to ensure that water and other substances cannot find their way into the bonded interface between layer 22 and bearing portion 23.

Still further, the resilient layer 22, 22a, 22b need not be bonded directly to the adjacent surface of frame 10. An additional strip of material which may be similar to that of bearing portion 23, 23a, 23b, or any other suitable material may be interposed between and bonded to layer 22 and frame 10.

What is claimed is:

1. A valve comprising a sliding closure member slidable across an opening defined within a frame to control the flow of liquid through said opening, and a sealing strip arranged between co-operating surface portions of the frame and the closure member respectively the sealing strip comprising a layer of resilient material fixed with respect to one of the surface portions, and a bearing portion bonded to the resilient layer and adapted to bear on the other surface portion thus to slide thereon as the closure member is moved between its closed and open positions in operation of the valve, characterised in that the bearing portion carries a part of increased thickness which extends towards the surface portion to which the resilient layer is fixed, said part thus serving to limit the maximum compression of the resilient portion when the valve is closed.

2. A valve according to claim 1, wherein said part of increased thickness is in the form of a longitudinal rib integrally moulded with the bearing portion and having a thickness less than that of the resilient layer.

3. A valve according to claim 1, wherein the resilient layer is formed with a longitudinal groove to receive said part of increased thickness.

4. A valve according to claim 1, wherein the resilient layer is of a material such that in use it may become partially compressed by a degree less than that required for the part of increased thickness to compress completely that part of the resilient layer beneath it.

5. A valve according to claim 1, wherein said part of increased thickness is disposed between and spaced inwardly from the longitudinal edges of the bearing portion and the resilient layer.

6. A valve according to claim 1, wherein the part of increased thickness is disposed along one longitudinal edge of the bearing portion.

7. A valve according to claim 1, wherein the part of increased thickness is formed by the bearing portion being wedge shaped in cross-section with one longitudinal edge region thicker than the other, the resilient layer being correspondingly shaped.

8. A valve according to claim 1, wherein a sealing strip comprising a resilient layer and a bearing portion, is provided on both sides of the closure member.

9. A valve according to claim 1, wherein said bearing portion is a medium or high density, high molecular weight polyethylene.

10. A valve according to claim 1, in which said resilient layer is a foamed material such as nitrile or neoprene rubber.

* * * * *